United States Patent
Marin et al.

(10) Patent No.: US 9,789,948 B2
(45) Date of Patent: Oct. 17, 2017

(54) TOOL FOR SIMULTANEOUSLY HOLDING SEVERAL ATTACHMENT CLIPS IN CONTACT WITH AN AIRCRAFT FUSELAGE FRAME ELEMENT

(71) Applicant: Airbus Operations (S.A.S.), Toulouse (FR)

(72) Inventors: Yannick Marin, L'Isle Jourdain (FR); Emilie Luche, Lias (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/448,807

(22) Filed: Jul. 31, 2014

(65) Prior Publication Data

US 2015/0034766 A1    Feb. 5, 2015

(30) Foreign Application Priority Data

Aug. 1, 2013  (FR) ...................................... 13 57674

(51) Int. Cl.
| | |
|---|---|
| *B64C 1/12* | (2006.01) |
| *B64F 5/10* | (2017.01) |
| *B64C 1/06* | (2006.01) |

(52) U.S. Cl.
CPC ................ *B64C 1/12* (2013.01); *B64C 1/061* (2013.01); *B64F 5/10* (2017.01); *B64C 1/068* (2013.01); *Y02P 70/585* (2015.11); *Y10T 29/4981* (2015.01); *Y10T 29/49947* (2015.01)

(58) Field of Classification Search
CPC . B64C 1/12; B64C 1/069; B64C 1/068; B64F 5/0009; B64F 5/10; F16B 39/101; F16B 15/08; Y10S 206/82; Y10S 411/966; Y10S 411/969; Y10S 411/97; Y10T 29/4981; Y10T 29/49947; Y10T 24/3431; Y10T 24/3439

See application file for complete search history.

(56) References Cited

U.S. PATENT DOCUMENTS 2,620,008 A * 12/1952 Mallard ................ F16B 39/101
                                                    206/343
2,680,497 A *  6/1954 Miller ..................... F16N 21/06
                                                    184/105.3

(Continued)

FOREIGN PATENT DOCUMENTS

| CA | 2367728 A1 | 7/2002 |
|---|---|---|
| CN | 201 496 349 | 6/2010 |

(Continued)

OTHER PUBLICATIONS

French Search Report for Application No. 1357676 dated May 14, 2014.

(Continued)

*Primary Examiner* — Jermie Cozart
(74) *Attorney, Agent, or Firm* — Jenkins, Wilson, Taylor & Hunt, P.A.

(57) ABSTRACT

A system with attachment clips designed to fix an attachment element of an aircraft fuselage frame onto a fuselage skin and/or to stiffeners fitted onto this fuselage skin is provided. The system includes tooling elements arranged alternately with the clips such that they connect to each other, in order to reduce the fabrication time and cost of an aircraft fuselage.

15 Claims, 3 Drawing Sheets

(56) References Cited

U.S. PATENT DOCUMENTS

| | | | |
|---|---|---|---|
| 3,036,521 A * | 5/1962 | Owen | E21B 43/117 175/4.6 |
| 3,083,429 A * | 4/1963 | Barlow | A44B 17/0058 206/345 |
| 3,117,610 A * | 1/1964 | Matthews | F16B 39/20 29/417 |
| 3,165,968 A * | 1/1965 | Anstett | F16B 15/08 206/343 |
| 3,177,915 A * | 4/1965 | La Fleur | F16B 37/048 206/820 |
| 3,241,658 A * | 3/1966 | Anderson | A47B 95/02 16/436 |
| 3,467,417 A * | 9/1969 | Whiteside | F16B 35/06 403/408.1 |
| 3,648,749 A * | 3/1972 | Warren | F16B 39/10 411/87 |
| 3,704,507 A * | 12/1972 | Grube | B21D 53/24 206/343 |
| 3,711,931 A * | 1/1973 | Ladouceur | B23P 13/00 206/338 |
| 3,845,860 A * | 11/1974 | Ladouceur | B23P 13/00 206/338 |
| 3,967,528 A * | 7/1976 | Baker | B64D 7/08 411/548 |
| 3,999,659 A * | 12/1976 | Grube | B21D 53/24 206/343 |
| 4,203,204 A | 5/1980 | Murphy | |
| 4,310,132 A | 1/1982 | Robinson et al. | |
| 4,310,964 A | 1/1982 | Murphy | |
| 4,412,820 A * | 11/1983 | Brummond | A61C 7/306 433/18 |
| 4,946,386 A * | 8/1990 | Kidd | A61C 7/306 206/820 |
| 4,995,146 A | 2/1991 | Woods | |
| 5,105,515 A | 4/1992 | Nelson | |
| 5,116,178 A * | 5/1992 | Lerman | F16B 39/20 403/316 |
| 5,142,764 A | 9/1992 | Whiteside | |
| 5,242,523 A | 9/1993 | Willden et al. | |
| 5,273,426 A * | 12/1993 | Dragan | A61C 7/306 433/11 |
| 5,314,065 A * | 5/1994 | Ayres | F16B 15/0015 206/340 |
| 5,477,596 A | 12/1995 | Schlosstein et al. | |
| 5,564,564 A * | 10/1996 | Poffenberger | B65D 69/00 206/338 |
| 5,596,859 A | 1/1997 | Horton et al. | |
| 5,632,583 A * | 5/1997 | Schneider | F16B 41/002 411/84 |
| 5,775,514 A * | 7/1998 | Lin | F16B 27/00 206/343 |
| 5,878,880 A * | 3/1999 | Poffenberger | B65D 69/00 206/338 |
| 5,927,491 A * | 7/1999 | Room | F16B 15/08 206/340 |
| 5,964,072 A | 10/1999 | Rasmussen | |
| 6,073,326 A | 6/2000 | Banks et al. | |
| 6,088,897 A | 7/2000 | Banks et al. | |
| 6,134,940 A | 10/2000 | Banks et al. | |
| 6,141,848 A | 11/2000 | Yousko et al. | |
| 6,158,666 A | 12/2000 | Banks et al. | |
| 6,210,084 B1 | 4/2001 | Banks et al. | |
| 6,332,299 B1 | 12/2001 | Stewart, III | |
| 6,626,904 B1 * | 9/2003 | Jammet | A61B 17/7001 606/266 |
| 6,708,821 B2 * | 3/2004 | Tucker | B25B 23/045 206/345 |
| 6,889,414 B2 | 5/2005 | Korsedal | |
| 7,237,996 B2 * | 7/2007 | Vrana | B23P 19/062 206/345 |
| 7,427,180 B2 * | 9/2008 | Ladoucer | B23P 19/062 411/181 |
| 7,704,151 B2 * | 4/2010 | Vrana | B21K 1/66 470/18 |
| 7,735,780 B2 | 6/2010 | Coles | |
| 7,882,948 B2 * | 2/2011 | West | B21D 53/36 206/338 |
| 8,142,125 B2 * | 3/2012 | Vrana | F16B 37/062 411/181 |
| 8,235,634 B2 * | 8/2012 | Larsen | F16B 27/00 411/112 |
| 8,720,730 B2 * | 5/2014 | Bodden, Jr. | B65D 55/16 220/375 |
| 8,784,028 B2 * | 7/2014 | Clark | F16B 41/002 411/204 |
| 8,899,522 B2 | 12/2014 | Vinue Santolalla | |
| 9,088,146 B2 * | 7/2015 | Schnoor | H02G 3/32 |
| 9,232,965 B2 * | 1/2016 | Hawkes | A61B 17/7007 |
| 9,527,606 B2 | 12/2016 | Marin et al. | |
| 2004/0237281 A1 | 12/2004 | Korsedal | |
| 2005/0013679 A1 * | 1/2005 | Ladoucer | B23P 19/062 411/180 |
| 2007/0246876 A1 | 10/2007 | Wood et al. | |
| 2007/0297870 A1 * | 12/2007 | Vrana | F16B 37/062 411/180 |
| 2008/0128550 A1 | 6/2008 | Roming | |
| 2010/0282937 A1 * | 11/2010 | Schnoor | H02G 3/32 248/225.21 |
| 2010/0295227 A1 | 11/2010 | Hung | |
| 2011/0020091 A1 * | 1/2011 | Larsen | F16B 27/00 411/84 |
| 2011/0042519 A1 | 2/2011 | Tacke | |
| 2012/0011693 A1 | 1/2012 | Amirehteshami et al. | |
| 2012/0184384 A1 * | 7/2012 | Dieter | B23D 33/02 470/25 |
| 2014/0031647 A1 * | 1/2014 | Lin | A61B 5/0059 600/317 |
| 2014/0101923 A1 * | 4/2014 | Clark | F16B 41/002 29/525.11 |
| 2015/0001343 A1 * | 1/2015 | Bernadet | B64C 1/12 244/119 |
| 2015/0034763 A1 | 2/2015 | Marin et al. | |
| 2015/0040369 A1 | 2/2015 | Marin et al. | |

FOREIGN PATENT DOCUMENTS

| | | | |
|---|---|---|---|
| DE | 10 2006 051 457 | | 5/2008 |
| DE | 10 2009 056 999 | | 6/2011 |
| EP | 2 565 117 | | 3/2013 |
| FR | 1 345 076 | | 12/1963 |
| FR | 2 489 779 | | 3/1982 |
| FR | 2 507 943 | | 12/1982 |
| FR | 2 977 296 | | 1/2013 |
| GB | 2 494 775 | | 3/2013 |
| GB | 2510170 A * | 7/2014 | ............ F16B 39/101 |
| WO | WO 2010/118448 | | 10/2010 |

OTHER PUBLICATIONS

French Search Report for Application No. 1357764 dated Apr. 4, 2014.
French Search Report for Application No. 1357672 dated Apr. 3, 2014.
Non-Final Office Action for U.S. Appl. No. 14/448,768 dated Aug. 2, 2016.
Non-Final Office Action for U.S. Appl. No. 14/448,768 dated Aug. 26, 2015.
Non-Final Office Action for U.S. Appl. No. 14/448,768 dated Nov. 12, 2015.
Non-Final Office Action for U.S. Appl. No. 14/448,779 dated Mar. 17, 2016.
Final Office Action for U.S. Appl. No. 14/448,768 dated Apr. 22, 2016.
Final Office Action for U.S. Appl. No. 14/448,768 dated Jan. 12, 2017.
Interview Summary for U.S. Appl. No. 14/448,768 dated Jan. 31, 2017.

(56) References Cited

OTHER PUBLICATIONS

Notice of Allowance for U.S. Appl. No. 14/448,768 dated Apr. 28, 2017.

* cited by examiner

TOOL FOR SIMULTANEOUSLY HOLDING SEVERAL ATTACHMENT CLIPS IN CONTACT WITH AN AIRCRAFT FUSELAGE FRAME ELEMENT

TECHNICAL DOMAIN

The subject matter disclosed herein relates to the domain of aircraft fuselages, and particularly to the domain of installing attachment clips to fix an aircraft fuselage frame element to a fuselage skin and/or to stiffeners fitted on the skin of this fuselage.

The subject matter disclosed herein is most particularly but not exclusively applicable to the field of commercial aircraft.

BACKGROUND

Aircraft fuselages are designed to resist loads induced by pressurisation and loads transmitted by the engines.

This is why fuselages usually comprise circumferential frames, also called <<orbital frames>>, and an aerodynamic skin sometimes called a <<self-stiffened skin>>, fixed to these circumferential frames and provided with stiffeners usually along the longitudinal direction, that are fixed on an inside face of the skin and are usually called <<stringers>>.

The stringers may have different types of sections, for example T, I, J or Ω. In some known configurations, the circumferential frames have a sole plate fixed directly onto the inside face of the self-stiffened skin, in which case the frames comprise notches through which stringers are routed. In other known configurations, the stringers are inserted between the circumferential frames and the self-stiffened skin, and then are routed above the stringers.

In both cases, and particularly in the latter case, angles usually called <<clips>> are placed between the stringers to connect the circumferential frames to the skin and/or the longitudinal stiffeners.

Nevertheless, the clips are put into place on the frame and are fixed one by one. This individual treatment of each clip makes the assembly method expensive, particularly because there are very many clips associated with each fuselage frame. Moreover, this fuselage fabrication phase usually requires the presence of several operators inside the fuselage segment concerned due to the large number of attachment clips. Consequently, it can be difficult to perform other assembly tasks inside the segment at the same time when operators are putting these clips into place and fixing them, which is another factor tending to increase fabrication costs and times.

Therefore there is a need to optimise this clip placement and attachment phase to limit its impact on the global fuselage manufacturing cost.

SUMMARY

Therefore, the purpose of the subject matter disclosed herein is to at least partially overcome the disadvantages mentioned above related to embodiments according to prior art.

The first purpose of the subject matter disclosed herein to achieve this is a system comprising a plurality of attachment clips designed to fix an attachment element of an aircraft fuselage frame onto a fuselage skin and/or to stiffeners fitted onto this fuselage skin, the system also comprising junction elements, preferably tooling elements, arranged alternately with the clips that they connect to each other.

The subject matter disclosed herein differs from current techniques based on individual treatment of each clip in that it uses a system comprising several clips preassembled by junction elements that are preferably tooling elements that will be removed and reused after the clips have been attached to the frame. Therefore the system according to the subject matter disclosed herein facilitates the operation to place clips on the frame element. The result is that operations are rationalised, which has the advantage of reducing assembly times and therefore costs. Furthermore, once these clips have been put into place on the frame element, they can be fixed more easily and more quickly, which reduces the number of operators necessary inside the fuselage. Other assembly operations can thus be done at the same time in the fuselage segment concerned, with the result of reducing the global fuselage fabrication time and cost. This advantage is even more remarkable when such a clip attachment operation is automated, for example using robots.

As mentioned above, the junction elements are preferably tooling elements that will be removed and reused after the clips have been attached on the frame. Alternatively, these junction elements can be kept after the clips have been attached to the frame, and therefore form an integral part of the fuselage without ever being removed. In the following description, the former case will be preferred in which the junction elements are tooling elements that will be removed and reused.

The subject matter disclosed herein preferably incorporates one or several of the optional characteristics described below.

Each of at least several of the attachment clips comprises two connection devices, each mounted on one of the tooling elements.

At least one of the two connection devices is in the form of a tab.

At least one of the two connection devices is removable. Preferably, the removable connection device has a mechanically weakened zone which can be broken to separate the attachment clip. The clip may be made removable by a means other than breaking, without going outside the scope of the subject matter disclosed herein.

At least one of the two connection devices is designed so that it forms a fastening device for an equipment that will be mounted on the fuselage, after its associated tooling element has been removed.

The tooling elements may be in the form of rods preferably oriented approximately parallel to a longitudinal direction of the system along which these tooling elements and attachment clips are placed in sequence.

One end of each of at least several of the rods is connected to one end of a first attachment clip and the other end of each of the several rods is connected to one end of a second attachment clip, the first and second clips being placed on opposite sides of the rod.

Each attachment clip has at least one part shaped like a corner reinforcement.

At least several of the tooling elements and the clips are connected to each other by flexible connections. This makes it possible to form a flexible and generally linear system within which parts arranged alternately behave like train wagons. Advantageously, this special feature means that the system is capable of accepting deformation so that it can optimally match the geometry of the fuselage frame element.

Alternatively, the connections could be rigid instead of being flexible. In such cases, tooling elements may be inclined relative to each other or may be curved, to obtain a curvature practically the same as the curvature of the frame element. For example, the rods may have the shape of the arc of a circle.

Preferably, the system comprises between five and fifteen attachment clips.

Another purpose of the subject matter disclosed herein is an assembly comprising an element of the fuselage frame and a system like that described above, with attachment clips bearing in contact with the frame element.

Another purpose of the subject matter disclosed herein is a method of assembling attachment clips onto an element of an aircraft fuselage frame, comprising a step in which the clips in the system described above are fixed to the frame element, and a step in which tooling elements are removed from the system.

These two steps may be done either in sequence or simultaneously, since each tooling element may be removed as soon as the two clips that it connects have been fixed to the frame element. The tooling elements are designed so that they can be reused to form another system according to the subject matter disclosed herein, with new attachment clips.

Preferably, the assembly method is used when the fuselage frame element is already in position relative to the fuselage skin, or it is used when the fuselage frame element is at a distance from the skin, preferably away from the fuselage segment into which the frame element must be integrated. In this case, the frame element to which the clips are attached is then brought inside the fuselage segment, to be attached to the skin and/or the stiffeners.

Another purpose of the subject matter disclosed herein is a method of attaching a fuselage frame element onto a fuselage skin and/or on stiffeners fixed to the skin, including a step in the assembly method described above and a step to attach the clips to the skin and/or the stiffeners.

In this case too, when the assembly method is applied in situ in the fuselage segment, the two steps in the attachment method can be done in sequence or at the same time. Furthermore, as mentioned above, when the assembly is made outside the segment, the tooling elements are preferably removed before the frame element is displaced in the segment, and therefore before the clips are attached to the skin and/or the stiffeners. Nevertheless, these tooling elements may be removed during or after this step in which the clips are attached to the skin and/or to the stiffeners.

Other advantages and characteristics of the subject matter disclosed herein will become clear in the non-limitative detailed description given below.

BRIEF DESCRIPTION OF THE DRAWINGS

This description is made with reference to the appended drawings, in which.

DETAILED DESCRIPTION

Figure 1:
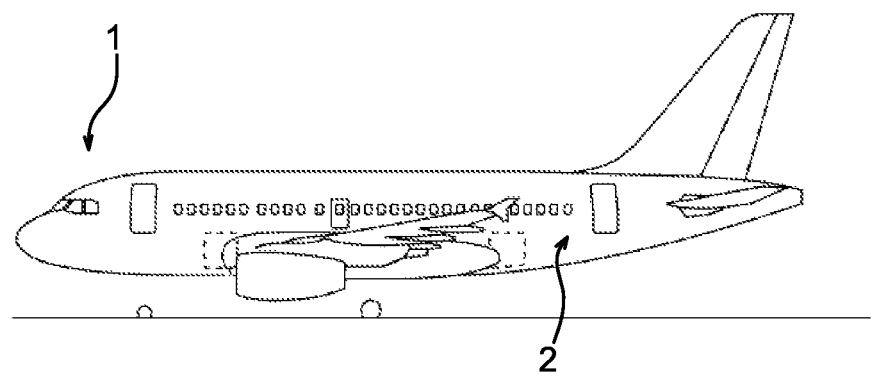
FIG. 1 shows a side view of an aircraft with a fuselage that will be made using systems specific to the subject matter disclosed herein.
Figure 2:
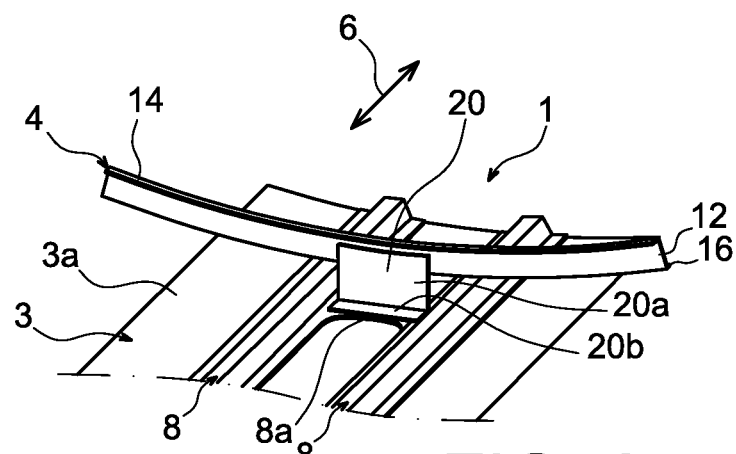
FIG. 2 shows an enlarged view of a part of the fuselage shown in the previous figure, as seen from inside the aircraft.

With reference firstly to FIG. 1, the figure shows a commercial aircraft 1 with a fuselage 2, a part of which is shown in more detail in FIG. 2, this part of the fuselage 2 being seen from inside the aircraft.

Conventionally, the fuselage 2 comprises a skin 3, the frames of the fuselage 4 (only one of which is shown in FIG. 2) being fixed to and supported by the inside face 3a of the skin 3. This frame 4 extends over all or some of the periphery of the fuselage, in a transverse plane of the aircraft, in other words in a plane orthogonal to direction 6 which is the longitudinal and axial direction of the aircraft. Each frame may be made in a single piece, or it may be formed from several frame elements/segments each of which only forms an angular sector of the frame, these elements then being assembled end to end. Typically, a frame element extends around an angular sector of the order of 30 to 120°.Other angular sectors could also be chosen without going outside the scope of the subject matter disclosed herein. For convenience, the frame element visible in FIG. 2 and in subsequent figures will be referred to as <<frame 4>> for the remainder of this description. However, it should be noted that the design of other frame elements making up the frame is identical or similar to the design described below and that is specific to the subject matter disclosed herein.

Moreover, the fuselage 2 comprises a plurality of longitudinal stringers 8 that are stiffeners, in the form of reinforcing parts passing between frames 4 and the skin 3. All stringers 8 running along the longitudinal direction 6 are fixed to the inside face 3a of the skin by conventional structure such as rivets. In this case, the stringers 8 have a generally Ω shape, but they could have another shape, for example I, L, J, etc.

Each frame 4 comprises a web 12 that is the vertical part shown in FIG. 2, at the end of which the flange 14 is located while the sole plate 16 is located at the other end. Conventionally, the web connecting the flange to the sole plate is like the central part of the stiffener, while the sole plate will be fixed to the top part of the stringers 8. The sole plate 16, also called the base, is fixed by conventional means like rivets or bolts. The flange 14 forms the free end of the stiffener opposite the end formed by the sole plate.

In the embodiment shown, the section of the frame 4 has a generally "S" or "Z" shape with the web 12 approximately perpendicular to the flange 14 and to the sole plate 16, forming opposite ends of the frame. Nevertheless, angles other than 90° may be chosen for some frames 4, particularly for frames in the nose cone or the tail section of the aircraft. However, other general section shapes are possible, for example I, Ω, shapes, etc. Hollow sections could also be considered without going outside the scope of the subject matter disclosed herein.

The fuselage 2 also comprises attachment clips 20 that will fix the fuselage frames 4 on the skin 3 and/or on the stringers 8 fixed to the skin. Each frame 4 is also fixed using a plurality of clips 20 distributed along this frame, preferably being located between the stringers 8. In the example shown in FIG. 2, each attachment clip 20 comprises a transverse vertical portion 20a that will be in contact with and will be fixed to the web 12 of the frame, and an approximately orthogonal portion 20b along the axial direction that will be in contact with and will be fixed to the skin 3. As shown as an example in FIG. 2, the portion 20b is not necessarily bearing on the skin, but it may be in contact with a stringer connecting portion 8a itself in contact with the skin 3. When the portion 20b is fixed to the skin, preferably by rivets or a similar structure, it is also fixed to the stringers 8 by rivets that pass through the above-mentioned connecting portion 8a.

Therefore in this embodiment, each clip 20 has a generally L-shaped section. Nevertheless, other shapes can be envisaged such as a clip, at least part of which is in the form of a corner reinforcement, with another portion connecting portions 20a, 20b as described with reference to the following figures.

The fuselage 2 may also comprise other attachment elements such as stabilisers connecting the stringers to the fuselage frames although it has not been shown.

Figure 3:
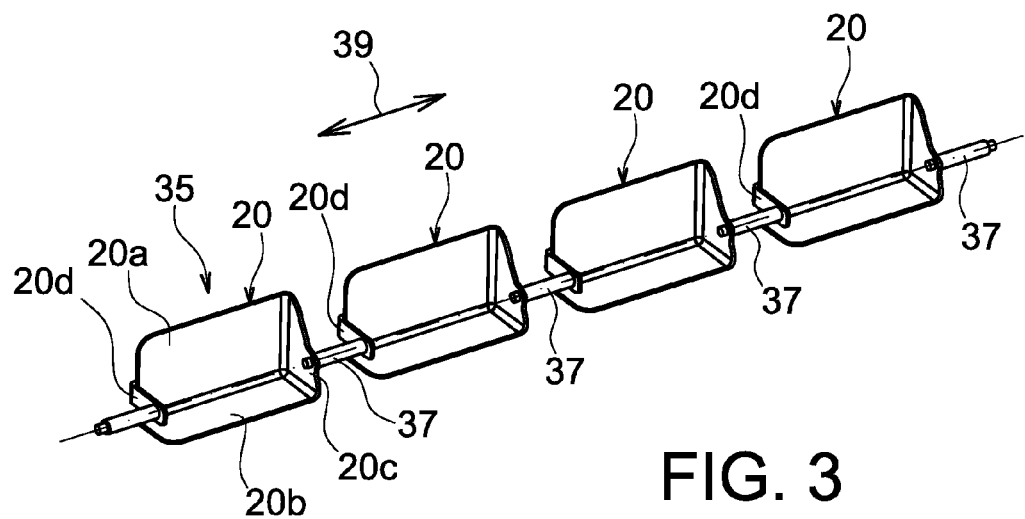
FIG. 3 shows a perspective view of a system according to a preferred embodiment of the subject matter disclosed herein.
Figure 4:
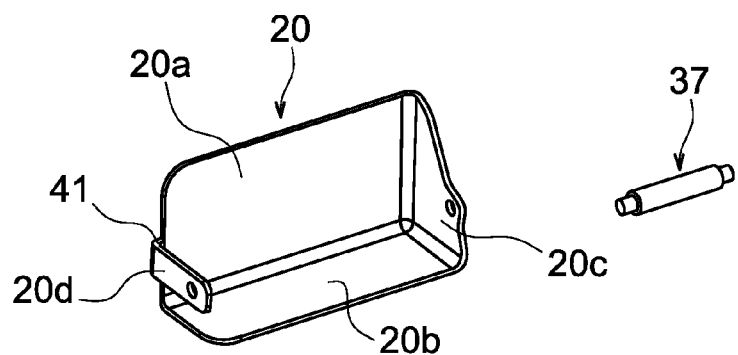
FIG. 4 shows a perspective view of components of the system shown in the previous figure.

We will now describe a system 35 according to a preferred embodiment of the subject matter disclosed herein with reference to FIGS. 3 and 4. This system will contain several attachment clips 20, so that they can be moved and put into position at the same time on one of the frames 4 to be fixed. Note that a single system 35 may be used to install all clips for a particular frame 4, or possibly several systems 35 may be put end to end to install all clips on this frame. In any case, it is preferable that each system 35 should include between five and fifteen clips 20. The following description applies to a single system 35 associated with each frame 4, for example extending over a 60 to 120° angular sector.

Therefore the system 35 comprises clips 20 that are temporarily connected to each other by tooling elements 37. More precisely, the system comprises attachment clips 20 and tooling elements 37 arranged alternately along a longitudinal direction 39 of the system. One end of each tooling element 37 is also connected to a first clip 20, and its opposite end is connected to a second clip 20 directly consecutive to the first clip in the system along the direction 39. Nevertheless, tooling elements 37 may be provided at the ends of the system 35 that are thus only connected to the clips through one of their ends, the other end remaining free or being used for attachment of the system to the remainder of the fuselage for the duration of the method of fixing the frame 4.

Therefore each clip 20 in the system 35 is in the general shape of a corner reinforcement with three portions 20a, 20b, 20c orthogonal to each other. The additional portion 20c, oriented orthogonal to direction 39, forms a connection device in that an orifice is formed in it. This clip 20 comprises another tab-shaped connection device 20d at its opposite end along direction 39, for example formed in a single piece with the clip, preferably made from a composite material comprising a mix of fibres and resin. The tab 20d comprises a first end fixed to the portion 20a of the clip, and a second end in which an orifice has been formed.

The two connection devices 20c, 20d are preferably parallel to each other and facing each other, and are designed to be mounted on tooling elements 37. In the preferred embodiment, the connection device 20c is designed to be structural and therefore to participate in the fuselage stiffness. It is also preferably designed to form an attachment device for equipment to be mounted on the fuselage, once its associated tooling element has been removed. For example, this equipment may be <<bracket>> type system connectors that can thus be mounted on the fuselage using the orifices that pass through the devices 20c of the attachment clips 20.

On the other hand, the tab 20d is designed to be removable and is removed from the clip 20 after the clip has been fixed to the fuselage. Preferably, removal is made by breaking the tab 20d at a mechanically weakened zone 41, which in this case consists of a fold close to the junction with the portion 20a. Nevertheless, any other design of a weakened zone may be envisaged, for example a reduction in the section and/or the thickness. According to yet another alternative, removal may be made by means other than breaking, for example by providing reversible assembly/disassembly means.

The tooling elements 37 are in the form of rods with their axis approximately parallel to direction 39, along which they are laid out alternating with the clips 20. The rods 37 are preferably practically in line with each other. They are straight, and each of them has two opposite ends. The first end of a rod is mounted on the portion 20c of a first clip, while the second opposite end of the rod is mounted on the tab 20d of a second clip, directly consecutive to it in the stack within the system 35. The ends of the rod 37 also pass through the orifices provided in the connection devices 20c, 20d, for assembly of this rod on these first and second clips located on each side of the rod.

The rods 37 fix the spacing between the clips 20, this spacing being approximately equal to the required spacing in the assembled configuration on the fuselage. Furthermore, the clips 20 and the rods 37 are connected to each other through flexible connections, for example obtained by forming clearances between the orifices of the devices 20c, 20d and the ends of the rods that pass through them. Clearances are chosen so as to make the long train type system 35 flexible, so that it will be capable of being deformed so that it can optimally match the geometry of the frame 4. In other words, with this flexibility, the system 35 may be deformed slightly to approximately match the curvature of the frame on which it is to be placed. With such clearance that are essentially radial and do not change or only slightly change the spacing between the clips along the direction 39, these clips can behave like wagons and thus optimally match the curvature of the frame 4. As an example, the chosen clearances allow one clip to tilt by not more than 15° from the direction of the immediately adjacent clip in the system 35. Not also that flexibility may be achieved solely through the assembly of one of the ends of the rod onto its associated connection device, the other rod end possibly being mounted to be rigid on its own connection device.

Figure 5:
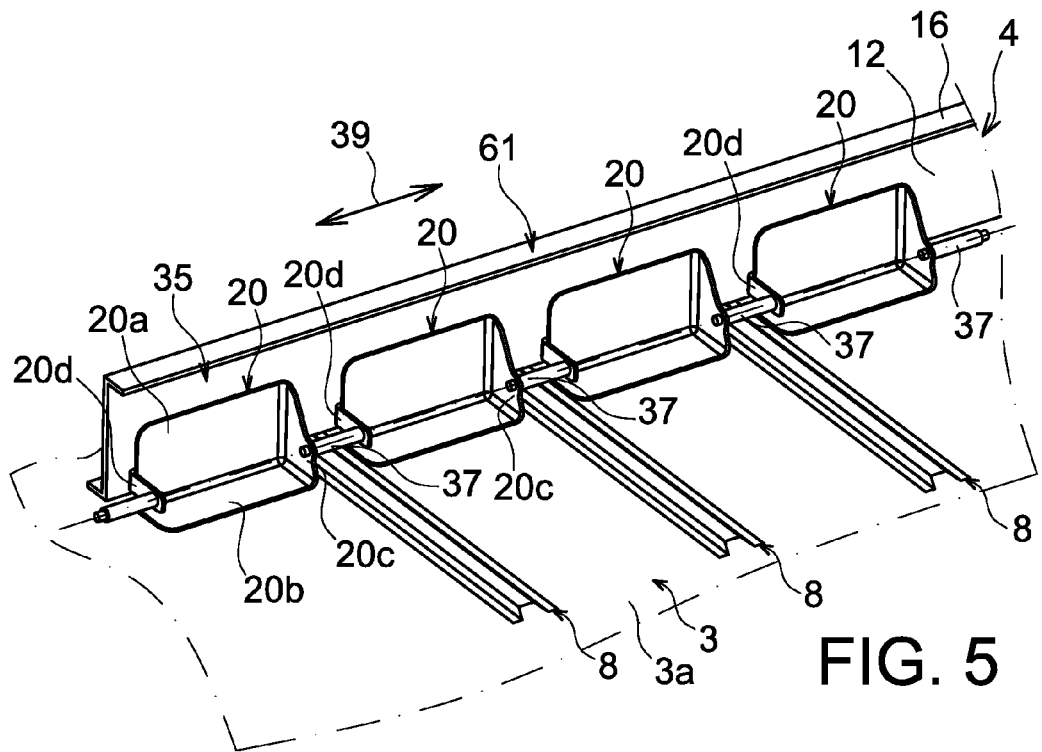
FIG. 5 shows an assembly according to a preferred embodiment of the subject matter disclosed herein, with attachment clips bearing on the fuselage frame element.

An assembly 61 according to the subject matter disclosed herein is made before the frame 4 is attached to the skin 3 and/or the stiffeners 8. This assembly 61 comprises the system 35 with its clips 20 in contact with the web 12 of the frame 4. This assembly 61 is preferably made when the frame 4 is in place on the skin 3, as shown in FIG. 5.

Nevertheless, the system 35 is thus preferably made outside the segment, for example using automated means such as robots that assemble the clips 20 on the rods 37. Only then is the system 35 brought into the fuselage segment and placed in contact with its corresponding frame 4, being slightly deformed due to the clearances and so as to match the curvature of the frame. This displacement of the system 35 in the fuselage segment may be made manually or may be automated, for example using robots.

When the system 35 is put into place on the frame 4, the rods 37 are placed above the stringers 8 with an Ω shaped section. Due to the spacing between the clips 20 predetermined by the rods, these clips are in their final position relative to the frame 4, between the stringers 8. Apart from the clips 20 bearing on the web 12, the axial portions 20b of the clips are also forced into contact with the skin 3.

Alternatively, the assembly 61 could be made outside the fuselage segment and then brought into the segment later. In this way, other tasks can be done in this segment at the same time. Obviously, this possibility of performing tasks simultaneously contributes to saving time and cost in fabrication of the fuselage.

The next step is to use an assembly method according to the subject matter disclosed herein, including a step to fasten the clips of the assembly 61 onto its frame 4 using rivets or similar structure. This step may be automated, for example using robots, which reduces its installation time. Furthermore, other assembly tasks can be done inside the segment due to the small size of these robots.

Figure 6:
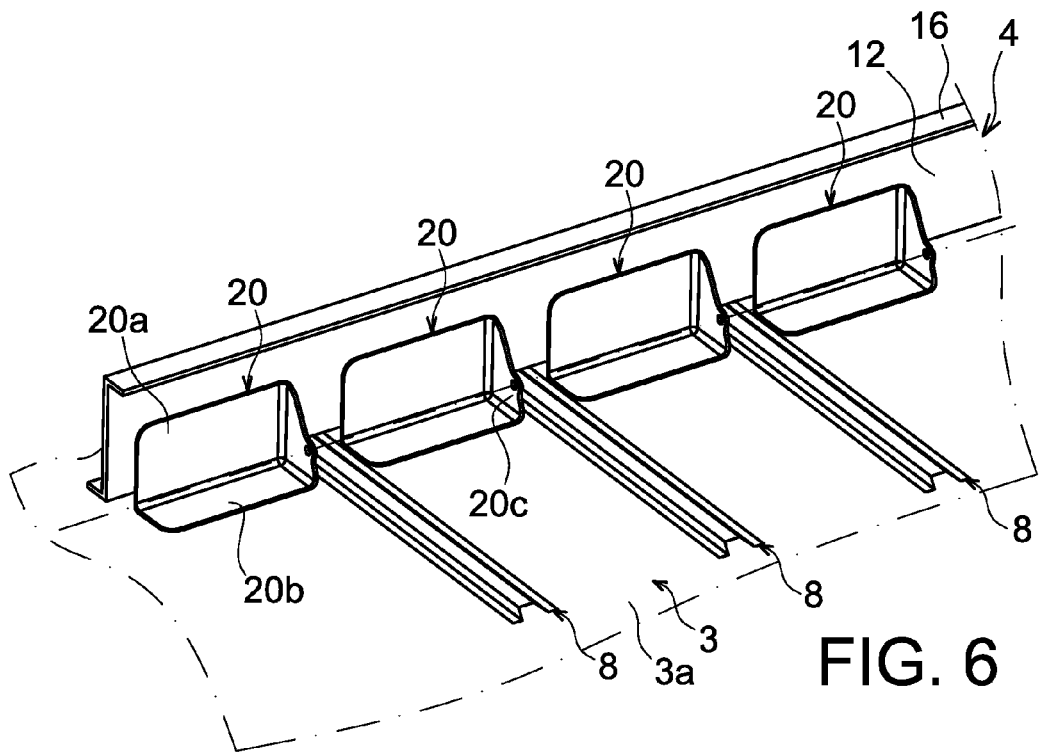
FIG. 6 shows a part of the fuselage after the tooling elements have been removed.

The next step, with reference to FIG. 6, is a step to remove the rods that are extracted from the system in which the clips 20 have already been fixed to the frame 4 by rivets. They may be removed by extracting each rod from its corresponding orifice on the portion 20c of one of the adjacent clips, while breaking the tab on the other adjacent clip. Once a rod has been removed from the orifice in its tab, it can be reused to form another system according to the subject matter disclosed herein.

It should be noted that the rods may be removed after all the clips 20 in the system have been fixed. Alternatively, a rod may be removed after each new clip has been fixed on the frame.

Finally, the subject matter disclosed herein also relates to a method of fastening the frame 4 to the fuselage skin 3 and/or on the stringers 8. This method includes a step to implement the assembly method as described above, and a step to attach the clips to the skin and/or the stringers, preferably by riveting or a similar structure, these two steps being done either at the same time or one after the other.

Preferably, each clip 20 is fixed to the frame 4 and to the skin 3 and/or the stringers 8 before removal of the rod connecting this clip to the next clip in the system that is already fixed to these fuselage elements 3, 4. Once again, a rod may be removed after each new clip has been fixed to the frame and to the skin and/or the stringers, or all rods may be removed after all clips 20 in the system have been fixed to the frame, the skin and/or the stringers.

Obviously, those skilled in the art may make various modifications to the subject matter disclosed herein that has just been described solely as non-limitative examples.

The invention claimed is:

1. A system comprising:
   a plurality of attachment clips in a number greater or equal to three, the system being designed to fix an attachment element of an aircraft fuselage frame onto a fuselage skin and/or to one or more fuselage stiffeners fitted onto the fuselage skin; and
   junction elements configured as reusable tooling elements arranged alternately with the plurality of attachment clips such that the tooling elements and the plurality of attachment clips connect to each other,
   wherein the junction elements are arranged such that the attachment clips are not in contact with each other.

2. The system according to claim 1, wherein each of at least several of the attachment clips comprise first and second connection devices, each mounted on one of the tooling elements.

3. The system according to claim 2, wherein at least one of the first and second connection devised is in the form of a tab.

4. The system according to claim 2, wherein at least one of the first and second connection devices is removable.

5. The system according to claim 4, wherein at least one of the first and second connection device comprises a mechanically weakened zone, which is breakable in order to separate from a respective one of the plurality of attachment clips.

6. The system according to claim 2, wherein at least one of the first and second connection devises is designed so that the at least one of the first and second connection devised forms a fastening device for equipment that will be mounted on the aircraft fuselage frame, after a tooling element associated with the at least one of the first and second connection devices has been removed.

7. The system according to claim 1, wherein the tooling elements are in the form of rods oriented approximately parallel to the longitudinal direction of the system along which these tooling elements and the plurality of attachment clips are placed in sequence.

8. The system according to claim 7, wherein one end of each of at least several of the rods is mounted to the first connection device of a first of the plurality of attachment clips and another end of each of the several rods is mounted to the second connection device of a second of the plurality of attachment clips, the first and second of the plurality of attachment clips being placed on opposite ends of each of the at least several of the rods.

9. The system according to claim 1, wherein each of the plurality of attachment clips comprises at least one part shaped like a corner reinforcement.

10. The system according to claim 1, wherein at least several of the tooling elements and the plurality of attachments clips are connected to each other by flexible connections.

11. The system according to claim 1, wherein the system comprises between five and fifteen attachment clips.

12. An assembly comprising:
    an element of the fuselage frame; and
    a system with a plurality of attachment clips being in contact with the element of the fuselage frame,
    wherein the system comprises:
      the plurality of attachment clips in a number greater or equal to three, the system being designed to fix an attachment element of an aircraft fuselage frame onto a fuselage skin and/or to one or more fuselage stiffeners fitted onto the fuselage skin; and
      junction elements configured as reusable tooling elements arranged alternately with the plurality of attachment clips such that the tooling elements and the plurality of attachment clips connect to each other,
    wherein the junction elements are arranged such that the attachment clips are not in contact with each other.

13. A method of assembling a plurality of attachment clips onto an element of an aircraft fuselage frame, the method comprising:
    fixing the plurality of attachment clips of a system to the element of the aircraft fuselage frame; and
    removing reusable tooling elements from the system,
    wherein the system comprises:
      the plurality of attachment clips in a number greater or equal to three, the system being designed to fix an attachment element of an aircraft fuselage frame onto a fuselage skin and/or to one or more fuselage stiffeners fitted onto the fuselage skin; and
      junction elements configured as reusable tooling elements arranged alternately with the plurality of attachment clips such that the tooling elements and the plurality of attachment clips connect to each other, wherein the junction elements are arranged such that the attachment clips are not in contact with each other.

14. The method according to claim 13, further comprising using the system when the element of the aircraft fuselage frame is already in position relative to a fuselage skin, or when the element of the aircraft fuselage frame is at a distance from the fuselage skin away from a fuselage segment into which the element of the aircraft fuselage frame is integrated.

15. The method of claim 13, further comprising:
attaching the plurality of attachment clips to the fuselage skin and/or the one or more fuselage stiffeners.

\* \* \* \* \*